(12) United States Patent
Yartsev (10) Patent No.: US 12,515,657 B2
(45) Date of Patent: Jan. 6, 2026

(54) AUTONOMOUS VEHICLE NAVIGATION BASED ON INTER-VEHICLE COMMUNICATION

(71) Applicant: The Regents of the University of California, Oakland, CA (US)

(72) Inventor: Michael Moshe Yartsev, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 260 days.

(21) Appl. No.: 18/044,542

(22) PCT Filed: Sep. 7, 2021

(86) PCT No.: PCT/US2021/071383
§ 371 (c)(1),
(2) Date: Mar. 8, 2023

(87) PCT Pub. No.: WO2022/056522
PCT Pub. Date: Mar. 17, 2022

(65) Prior Publication Data
US 2023/0331225 A1    Oct. 19, 2023

Related U.S. Application Data

(60) Provisional application No. 63/075,625, filed on Sep. 8, 2020.

(51) Int. Cl.
*B60W 30/14* (2006.01)
*B60W 40/04* (2006.01)
*B60W 60/00* (2020.01)

(52) U.S. Cl.
CPC .......... *B60W 30/143* (2013.01); *B60W 40/04* (2013.01); *B60W 60/001* (2020.02); *B60W 2554/4041* (2020.02); *B60W 2554/406* (2020.02); *B60W 2554/80* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 10,384,678 | B1 | 8/2019 | Konrardy et al. |
| 2014/0358416 | A1 | 12/2014 | Ibrahim |
| 2015/0309165 | A1 | 10/2015 | Elwart et al. |
| 2018/0061253 | A1* | 3/2018 | Hyun ................... G08G 1/0175 |
| 2018/0150086 | A1* | 5/2018 | Nobukawa ............. G08G 1/164 |

(Continued)

OTHER PUBLICATIONS

International Search Report and Written Opinion, PCT/US2021/071383, Dec. 29, 2021, 8 pages.

*Primary Examiner* — David P. Merlino (57) ABSTRACT

In one example, a method performed by a processing system of an autonomous vehicle includes reporting, to a first remote device, at least one of: a position of the first autonomous vehicle or an object detected in an environment surrounding the first autonomous vehicle, receiving from at least one of: the first remote device or a second remote device, data, wherein the data comprises at least one of: a current position of a second autonomous vehicle or an objected detected in an environment surrounding the second autonomous vehicle, and adjusting an operation of the first autonomous vehicle in response to the data.

20 Claims, 4 Drawing Sheets

(56) References Cited

U.S. PATENT DOCUMENTS

| | | | | |
|---|---|---|---|---|
| 2018/0335781 | A1* | 11/2018 | Chase | G08G 1/0133 |
| 2019/0239039 | A1* | 8/2019 | Hahn | H04W 72/044 |
| 2019/0266892 | A1* | 8/2019 | Günther | G08G 1/093 |
| 2022/0032970 | A1* | 2/2022 | Vadivelu | G06V 10/454 |
| 2022/0126832 | A1* | 4/2022 | Ewert | B60W 10/24 |

* cited by examiner

AUTONOMOUS VEHICLE NAVIGATION BASED ON INTER-VEHICLE COMMUNICATION

CROSS REFERENCE TO RELATED APPLICATIONS

This application is a 371 U.S. National Phase Application of International Application No. PCT/US2021/071383, filed on Sep. 7, 2021, which claims the benefit of U.S. Provisional Patent Application Ser. No. 63/075,625, filed on Sep. 8, 2020, both of which are herein incorporated by reference in their entirety.

FIELD OF THE DISCLOSURE

The present invention generally relates to autonomous vehicles, and more specifically relates to systems for providing navigation for autonomous vehicles based on inter-vehicle communication.

BACKGROUND

The field of autonomous transportation is rapidly evolving to operate in diverse settings and conditions. For instance, cars that can automate certain driver tasks (such as parking) are entering the mainstream, and many automobile manufacturers are actively developing technology to support fully autonomous cars (i.e., cars that are capable of operating without human control). Autonomous vehicles may take other forms as well, such as drones and robots moving on the ground or in the sky.

SUMMARY OF THE DISCLOSURE

In one example, a method performed by a processing system of an autonomous vehicle includes reporting, to a first remote device, at least one of: a position of the first autonomous vehicle or an object detected in an environment surrounding the first autonomous vehicle, receiving from at least one of: the first remote device or a second remote device, data, wherein the data comprises at least one of: a current position of a second autonomous vehicle or an objected detected in an environment surrounding the second autonomous vehicle, and adjusting an operation of the first autonomous vehicle in response to the data.

In another example, a non-transitory computer-readable medium stores instructions which, when executed by a processing system of an autonomous vehicle, cause the processing system to perform operations. The operations include reporting, to a first remote device, at least one of: a position of the first autonomous vehicle or an object detected in an environment surrounding the first autonomous vehicle, receiving from at least one of: the first remote device or a second remote device, data, wherein the data comprises at least one of: a current position of a second autonomous vehicle or an objected detected in an environment surrounding the second autonomous vehicle, and adjusting an operation of the first autonomous vehicle in response to the data.

In another example, an apparatus includes a processing system of a first autonomous vehicle and a non-transitory computer-readable medium stores instructions which, when executed by a processing system of an autonomous vehicle, cause the processing system to perform operations. The operations include reporting, to a first remote device, at least one of: a position of the first autonomous vehicle or an object detected in an environment surrounding the first autonomous vehicle, receiving from at least one of: the first remote device or a second remote device, data, wherein the data comprises at least one of: a current position of a second autonomous vehicle or an objected detected in an environment surrounding the second autonomous vehicle, and adjusting an operation of the first autonomous vehicle in response to the data.

BRIEF DESCRIPTION OF THE DRAWINGS

The teachings of the present disclosure can be readily understood by considering the following detailed description in conjunction with the accompanying drawings, in which.

DETAILED DESCRIPTION

In one example, the present disclosure provides systems for the navigation and control of autonomous vehicles (such as self-driving cars, drones, and/or other types of autonomous vehicles) based in inter-vehicle communication. As discussed above, the field of autonomous transportation is rapidly evolving to operate in diverse settings and conditions. Critical to the performance of an autonomous vehicle is the ability to detect other objects in the autonomous vehicle's vicinity, e.g., so that collisions between the autonomous vehicle and the other objects (including static objects, structures, humans, animals, other autonomous vehicles, and non-autonomous vehicles) can be avoided.

For instance, many autonomous vehicles utilize a plurality of different types of sensor systems to detect other objects, including sound navigation ranging (sonar) systems, light detection and ranging (lidar) systems, radar systems, and camera (e.g., RGB and/or infrared video camera) systems. These sensor systems collect data from the environment surrounding the autonomous vehicle, and the data may be analyzed by a processor of the autonomous vehicle in order to detect the presence and location of other objects. The processor may then adjust one or more operating parameters of the autonomous vehicle (e.g., speed, steering, and/or other parameters) in order to minimize the possibility of collision with the detected objects.

Although these sensor systems have been shown to improve the safety of autonomous vehicles by reducing collisions, these sensor systems typically operate in isolation. That is, each autonomous vehicle collects and processes data from the surrounding environment using its own sensor systems. As the number of autonomous vehicles on the road increases, however, the complexity of the computations needed to safely operate all of the autonomous vehicles grows exponentially. For instance, a vehicle may use its sensor systems to monitor the external environment at a particular sampling rate (e.g., emitting a sonar beam every x seconds), which generates a certain amount of data that must be quickly processed by the vehicle's processor. Across multiple vehicles, this creates a very large volume of computations that must be performed very quickly (e.g., in real or near-real time). Thus, treating each autonomous vehicle as an independent entity may result in inefficient use of computing resources, as many redundant data collections and computations may be performed (e.g., two vehicles in close proximity may be performing computations related to the same detected object in the road).

Examples of the present disclosure treat an autonomous vehicle as one part of a collective of autonomous vehicles. According to the proposed arrangement, autonomous vehicles may share data collected by their respective sensor systems with other autonomous vehicles. For instance, if one autonomous vehicle detects an object in the road, the autonomous vehicle may share information about the detected object (e.g., location, size, etc.) with other autonomous vehicles within a predefined radius (e.g., where the predefined radius may be measured geographically or in terms of communication ability). In one example, data may be shared among autonomous vehicles using direct, vehicle-to-vehicle communications. Direct communications may be preferable when sharing data with other autonomous vehicles in close proximity, as the data may be needed more immediately.

However, in other examples, the data may also be shared using indirect communications through an intermediary (e.g., a server or centralized collection point in the cloud). Indirect communications may be sufficient when sharing data with other autonomous vehicles outside of some predefined radius of proximity, as the data may not be needed immediately. The sharing of data among multiple vehicles may reduce the number of computations performed by the individual vehicles. For instance, if a first vehicle is receiving data about nearby objects from a second vehicle, then the sensor systems of the first vehicle may be able to safely operate at a reduced sampling rate, which may reduce the computational load on the first vehicle's processor. When this computational load is reduced across multiple vehicles, a tremendous savings in computing resources may be achieved. These and other aspects of the disclosure are discussed in greater detail below in connection with the examples of FIGS. 1-4.

Figure 1:
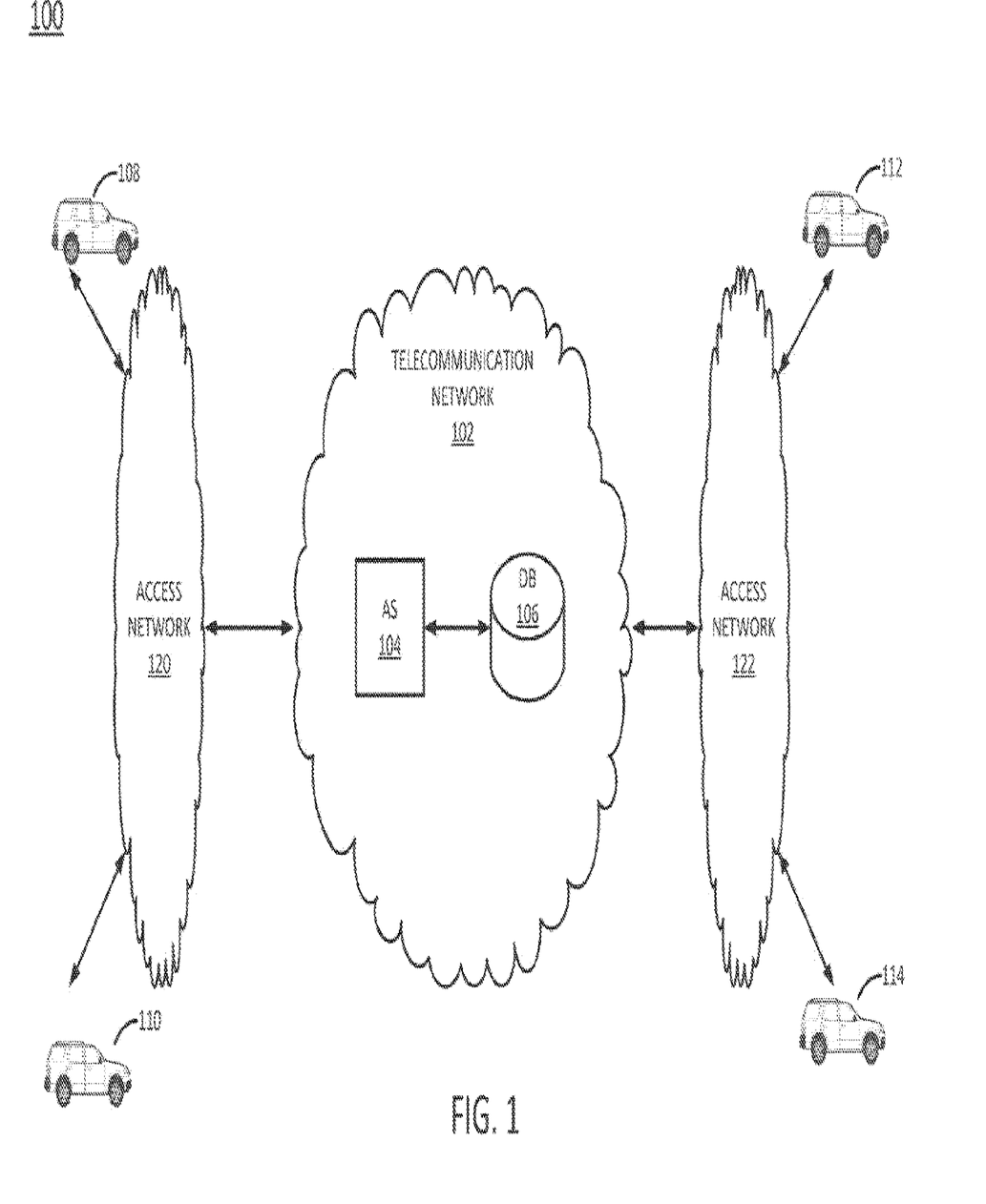
FIG. 1 illustrates an example system related to the present disclosure.

To aid in understanding the present disclosure, FIG. 1 illustrates an example system 100 related to the present disclosure. As shown in FIG. 1, the system 100 connects a plurality of vehicles 108, 110, 112, and 114 with one another and with various other devices such as an application server (AS) 104 and a database (DB) 106 via a core network, e.g., a telecommunication network 102, and one or more wireless access networks (e.g., cellular networks) 120 and 122. In one example, the vehicles 108-114 may be autonomous vehicles, and the system 100 may be configured to allow the vehicles 108-114 to share data about vehicle positions and detected objects with each other, as discussed in further detail below.

The telecommunication network 102 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 102 uses a network function virtualization infrastructure (NFVI), e.g., host devices or servers that are available as host devices to host virtual machines comprising virtual network functions (VNFs). In other words, at least a portion of the telecommunication network 102 may incorporate software-defined network (SDN) components.

Figure 4:
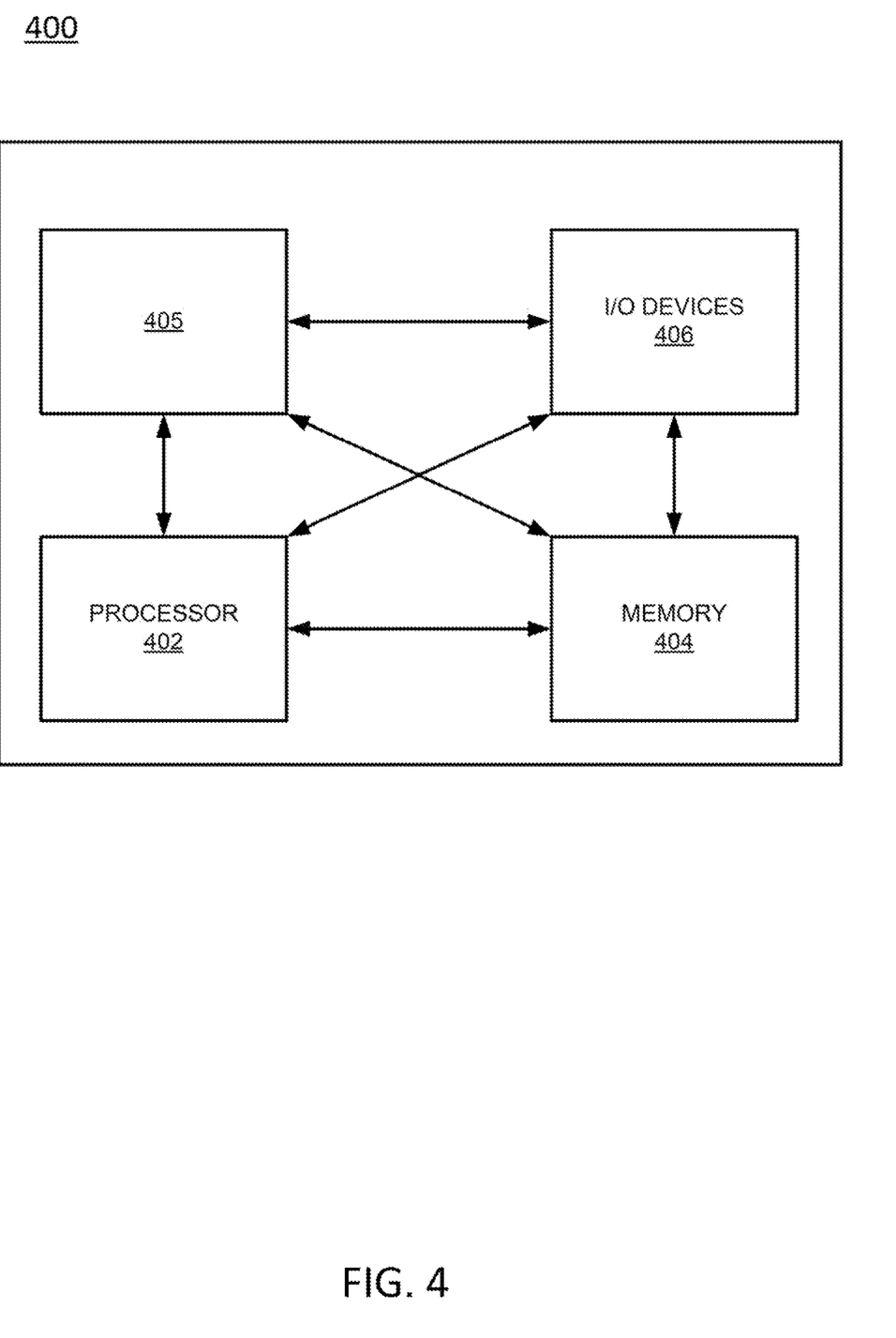
FIG. 4 depicts a high-level block diagram of a computing device or processing system specifically programmed to perform the functions described herein.

In one example, the AS 104 may comprise a computing system, such as computing system 400 depicted in FIG. 4, and may be configured to provide one or more functions for sharing vehicle position and detected object data, reported by the vehicles 108-114, with the vehicles 108-114, in accordance with the present disclosure. For example, AS 104 may be configured to collect data from a plurality of autonomous vehicles, where the data comprises information about the autonomous vehicles' locations and about objects detected by the sensor systems of the autonomous vehicles. The AS 104 may be further configured to share at least some of the data collected from the autonomous vehicles with other autonomous vehicles. In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

The DB 106 may store identifiers (e.g., IP addresses or other identifiers) for a plurality of autonomous vehicles, e.g., vehicles 108-114 and other vehicles, which may be registered with the system 100. The AS 104 may use the identifiers to track the positions of known vehicles 108-114 and to forward relevant data to the known vehicles 108-114. For instance, the vehicle 108 may report information about a detected object that is within some predefined radius (e.g., x feet) of the vehicle 110. Based on the detected object being present within the predefined radius of the vehicle 110, the AS 104 may send information about the detected object, reported by the vehicle 108, to the vehicle 110.

In one example, wireless access networks 120 and 122 may each comprise a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, each wireless access network 120 and 122 may comprise an access network in accordance with any "second generation" (2G), "third generation" (3G), "fourth generation" (4G), Long Term Evolution (LTE) or any other existing or yet to be developed future wireless/cellular network technology. In one example, wireless access networks 120 and 122 may be operated by the same or a different service provider that is operating telecommunication network 102.

In one example, vehicles 108-114 may each be equipped with an associated on-board unit (OBU) (e.g., a computing device and/or processing system, such as computing system 400 depicted in FIG. 4) for communicating with other vehicles 108-114 and with AS 104 via the wireless access networks 120 and/or 122. For example, the OBU may include a global positioning system (GPS) navigation unit that enables the driver to input a destination, and which determines the current location, calculates one or more routes to the destination from the current location, and assists the driver in navigating a selected route. In addition, in one example, any of the vehicles 108-114 may comprise autonomous or semi-autonomous vehicles which may handle various vehicular operations, such as braking, accelerating, slowing for traffic lights, changing lanes, etc. For instance, vehicles 108-114 may include lidar systems, sonar systems, radar systems, camera systems, GPS units, and so forth which may be configured to enable the vehicles 108-114 to travel to a destination with little to no human control or intervention.

It should be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers (including edge routers), switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

Figure 2:
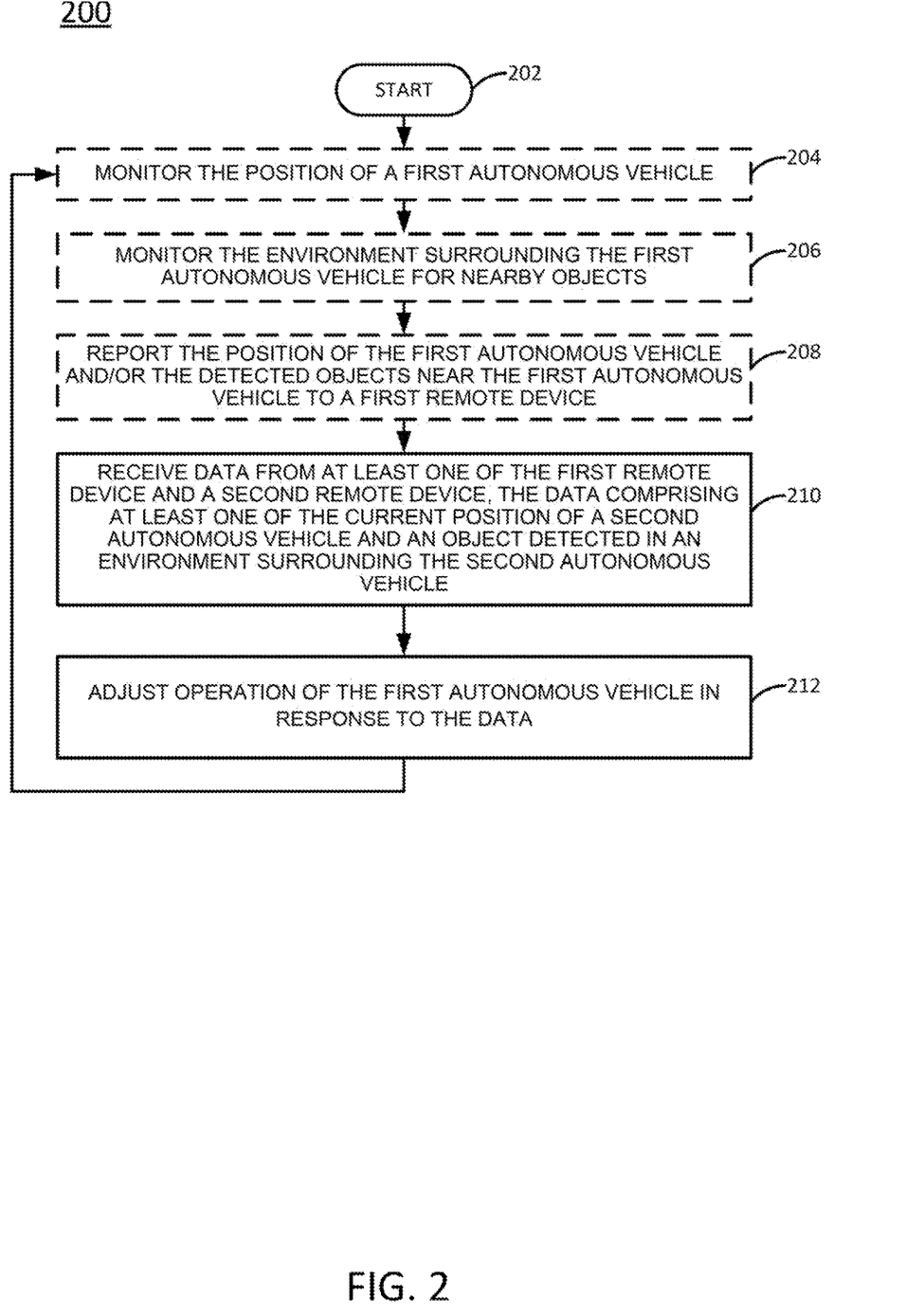
FIG. 2 is a flow diagram illustrating one example of a method for controlling an autonomous vehicle, according to the present disclosure.

FIG. 2 is a flow diagram illustrating one example of a method 200 for controlling an autonomous vehicle, according to the present disclosure. The method 200 may be performed, for instance, by an OBU or controller of an autonomous vehicle, such as any of the vehicles 108-114 illustrated in FIG. 1 and described above. Alternatively or in addition, the method 200 may be performed by a computing system, such as the computing system 400 illustrated in FIG. 4 and described in greater detail below. For the sake of example, the method 200 is described as being performed by a processing system.

The method 200 may begin in step 202. In optional step 204 (illustrated in phantom), the processing system may monitor the position of a first autonomous vehicle (of which the processing system may be a part). For instance, the processing system may analyze outputs of a global positioning system or other type of navigation system of the first autonomous vehicle in order to track the position of the first autonomous vehicle (e.g., defined in terms of positional coordinates, city and street(s), or in some other manner).

In optional step 206 (illustrated in phantom), the processing system may monitor the environment surrounding the first autonomous vehicle (e.g., within some predefined egocentric or allocentric radius, such as x feet) for nearby objects (e.g., other vehicles, static objects, individuals, and the like that are present within the predefined radius). For instance, the processing system may analyze the outputs of a sonar system, a lidar system, a radar system, a camera system, and/or another sensor system of the first autonomous vehicle in order to detect nearby objects within the predefined radius. Detected information about the detected nearby objects may include at least some of the following information: the types of the objects (e.g., vehicles, buildings, people, etc.), the locations of the objects, and the speeds at which the objects may be moving (where the speed may be stationary/not moving). The processing system may use information about detected nearby objects in order to control the operation (e.g., speed and/or direction of travel) of the first autonomous vehicle. For instance, the processing system may send signals to different systems of the first autonomous vehicle (e.g., braking system, steering system, accelerator, headlights, windshield wipers, etc.) in order to prevent a collision of the first autonomous vehicle with any of the detected nearby objects.

In optional step 208 (illustrated in phantom), the processing system may report the position of the first autonomous vehicle and/or the detected objects near the first autonomous vehicle to a first remote device. In one example, the first remote device may be a remote server, where the remote server collects reports of the positions and detected nearby objects from a plurality of autonomous vehicles. In another example, the first remote device is a second autonomous vehicle in the vicinity of (e.g., within some predefined radius of) the first autonomous vehicle. In one example, the predefined radius for the purpose of detecting other autonomous vehicles in the vicinity of the first autonomous vehicle may be a geographic distance (e.g., within x feet) or a communicative radius based on, for example, signal strength (e.g., received signal power within x decibels). In another example, the predefined radius may vary based on speed of travel, traffic density, and or other changeable factors (e.g., if traffic is dense and moving slowly, the predefined radius may be smaller, as it will take other vehicles longer to reach the position of the first autonomous vehicle; if traffic is light and moving quickly, the predefined radius may be larger, as it will take other vehicles less time to reach the position of the first autonomous vehicle). In one example, the processing system may report the position of the first autonomous vehicle and/or the detected objects near the first autonomous vehicle to both a remote server and a second autonomous vehicle.

In step 210, the processing system may receive data from at least one of the first remote device and a second remote device, where the data comprises at least one of: the current position of a second autonomous vehicle or an objected detected in an environment surrounding the second autonomous vehicle (where the second autonomous vehicle is one of the first remote device and the second remote device). In other words, the data may comprise the current position of the second autonomous vehicle, the object detected in the environment surrounding the second autonomous vehicle, or both.

The second autonomous vehicle may be a vehicle that is within some predefined geographic and/or communicative radius relative to the first autonomous vehicle. The current position of and detected nearby objects to the second autonomous vehicle may have been determined in the same manner as the position of and detected nearby objects to the first autonomous vehicle (e.g., as described in connection with steps 204 and 206), or the current position of and detected nearby objects to the second autonomous vehicle may have been determined in different manners. The data regarding the detected nearby objects to the second autonomous vehicle may include at least some of the following information: the types of the objects (e.g., vehicles, buildings, people, etc.), the locations of the objects, and the speeds at which the objects may be moving (where the speed may be stationary/not moving). In one example, the current position of and detected nearby objects to a second autonomous vehicle are received from a remote server. In another example, the current position of and detected nearby objects to a second autonomous vehicle are received directly from the second autonomous vehicle.

In step 212, the processing system may adjust operation of the first autonomous vehicle (e.g., speed and/or direction of travel, sampling rate of sensor system, spectral frequency of vehicle-to-vehicle communications, spatial footprint of vehicle-to-vehicle communications, etc.) in response to the current position of and detected nearby objects to the second autonomous vehicle. For instance, the current position of and detected nearby objects to the second autonomous vehicle may indicate that the second autonomous vehicle is twenty feet ahead of the first autonomous vehicle on the same road, and that the second autonomous vehicle just braked to avoid collision with an animal in the road. In response, the processing system may send signals to one or more systems of the first autonomous vehicle (e.g., braking system, steering system, etc.) to cause the first autonomous vehicle to slow down, change lanes, or the like.

The method 200 may then return to step 204 and continue as described above. Thus, the method 200 may iterate through the steps 204-212 for as long as the first autonomous vehicle is traveling, until the processing systems receives a signal (e.g., from a passenger of the first autonomous vehicle) to stop, or until some other time.

As discussed above, data may be shared among autonomous vehicles using direct, vehicle-to-vehicle communications. Direct communications may be preferable when sharing data with other autonomous vehicles in close proximity (e.g., within some predefined radius of proximity), as the data may be needed more immediately. However, in other examples, the data may also be shared using indirect communications through an intermediary (e.g., a server or centralized collection point in the cloud). Indirect communications may be sufficient when sharing data with other autonomous vehicles outside of some predefined radius of proximity, as the data may not be needed immediately.

Figure 3:
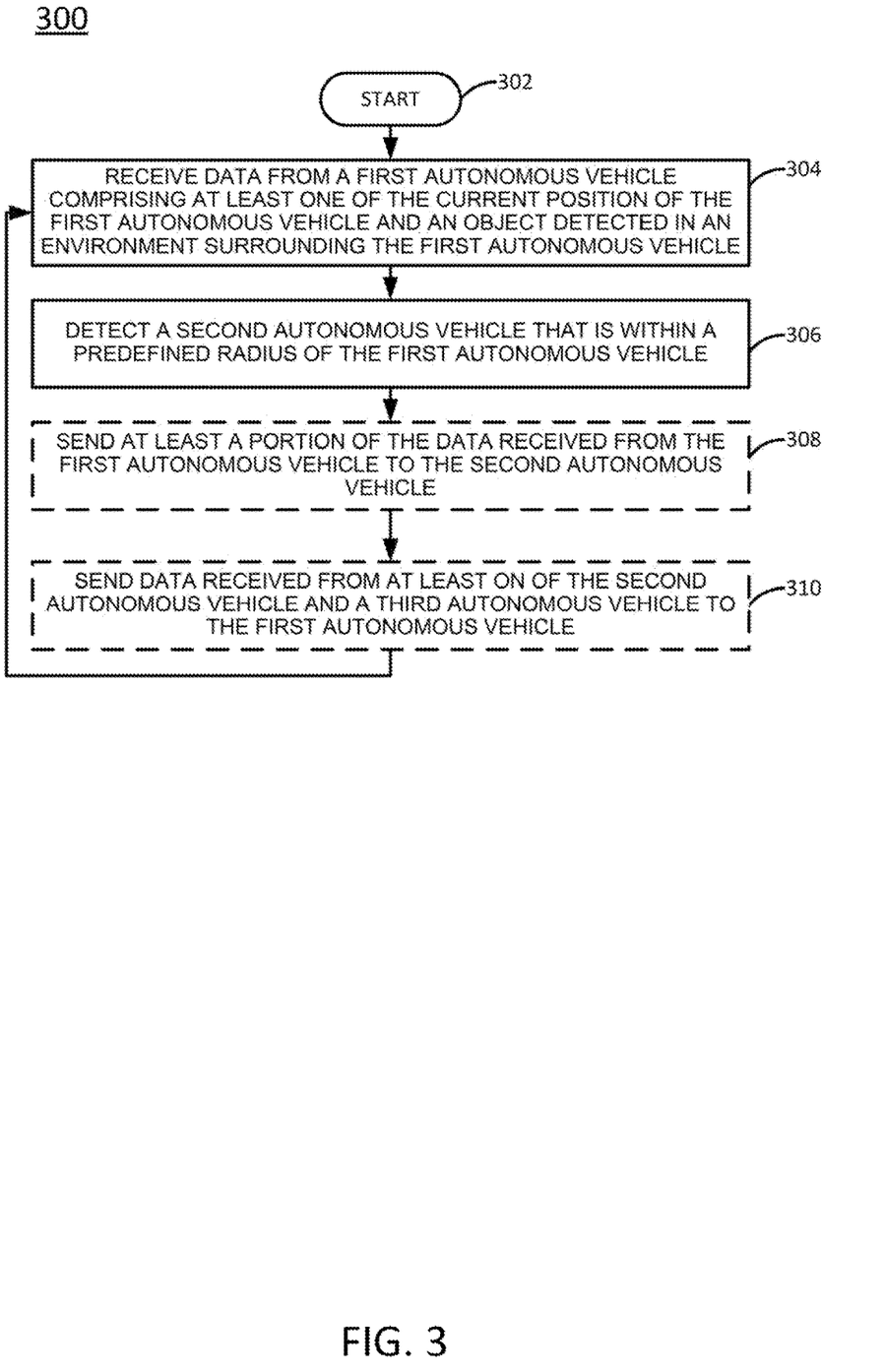
FIG. 3 is a flow diagram illustrating another example of a method for controlling an autonomous vehicle, according to the present disclosure.

FIG. 3 is a flow diagram illustrating another example of a method 300 for controlling an autonomous vehicle, according to the present disclosure. The method 300 may be performed, for instance, by an application server or a centralized collection point in the cloud, such as the AS 104 illustrated in FIG. 1 and described above. Alternatively or in addition, the method 300 may be performed by a computing system, such as the computing system 400 illustrated in FIG. 4 and described in greater detail below. For the sake of example, the method 300 is described as being performed by a processing system.

The method 300 may begin in step 302. In step 304, the processing system may receive data from a first autonomous vehicle, where the data comprises at least one of: a current position of the first autonomous vehicle and an object detected in an environment surrounding the first autonomous vehicle. The first autonomous vehicle may be one of a plurality of autonomous vehicles which is currently traveling and providing data to the processing system. The data that is provided by the first autonomous vehicle may have been collected by the first autonomous vehicle using systems of the first autonomous vehicle such as a GPS system, a lidar system, a radar system, a camera system, and/or another sensor system.

The data about the current position of the first autonomous vehicle may be defined in terms of positional coordinates, city and street(s), or in some other manner). The data about the objects detected near the first autonomous vehicle may include at least some of the following information: the types of the objects (e.g., vehicles, buildings, people, etc.), the locations of the objects, and the speeds at which the objects may be moving (where the speed may be stationary/not moving). The environment surrounding the first autonomous vehicle may be defined within some predefined egocentric or allocentric radius (e.g., a first predefined radius) of the first autonomous vehicle, such as x feet.

In step 206, the processing system may identify a second autonomous vehicle that is within a predefined radius (e.g., a second predefined radius, which may be different from the first predefined radius) of the first autonomous vehicle. In other words, the current position of the second autonomous vehicle is within the second predefined radius from the current position of the first autonomous vehicle. In one example, the predefined radius for the purpose of detecting the second autonomous vehicle may be a geographic distance (e.g., within x feet). In another example, the predefined radius may vary based on speed of travel, traffic density, and or other changeable factors (e.g., if traffic is dense and moving slowly, the predefined radius may be smaller, as it will take other vehicles longer to reach the position of the first autonomous vehicle; if traffic is light and moving quickly, the predefined radius may be larger, as it will take other vehicles less time to reach the position of the first autonomous vehicle).

In optional step 208 (illustrated in phantom), the processing system may send at least a portion of the data received from the first autonomous vehicle to the second autonomous vehicle. For instance, the processing system may determine that, based on the second autonomous vehicle being x feet behind the first autonomous vehicle in a same lane of the road, that the second autonomous vehicle is likely to encounter an obstruction in the road that was reported by the first autonomous vehicle. In one example, the processing system may indicate to the second autonomous vehicle the nature of the obstruction (e.g., an animal, a stopped vehicle, road construction, a patch of ice, etc.), a distance to the obstruction from the second autonomous vehicle's current position (e.g., x feet ahead), and/or an approximate amount of time that it will take the second autonomous vehicle to reach the obstruction based on the second autonomous vehicle's current position, rate of speed, and surroundings (e.g., y seconds).

Thus, the processing system sends the second autonomous vehicle information that may be relevant to safe operation of the second autonomous vehicle. For instance, based on the data sent by the processing system, the operating systems of the second autonomous vehicle may determine that is it appropriate to alter a direction and/or speed of travel or other operating condition of the second autonomous vehicle. For instance, a processor or OBU of the second autonomous vehicle may determine that the second autonomous vehicle should slow down, change lanes, turn on the headlights, turn on the windshield wiper, and/or the like based on the data provided by the processing system. In further examples, the processor or OBU may adjust a sampling rate of a sensor system of the second autonomous vehicle, a spectral frequency of vehicle-to-vehicle communications involving the second autonomous vehicle, a spatial footprint of the vehicle-to-vehicle communications, or other operating parameters of the second autonomous vehicle in response to the data provided by the processing system. In yet another example, the processing system may provide a recommendation for altering operation of the second autonomous vehicle along with the data provided in step 308 (e.g., slow down to avoid obstruction, turn headlights on while entering a storm, etc.).

In optional step 310 (illustrated in phantom), the processing system may send data received from at least one of the second autonomous vehicle and a third autonomous vehicle to the first autonomous vehicle. For instance, the processing system may determine that data reported by the second autonomous vehicle and/or the third autonomous vehicle (e.g., data regarding current position, current surrounding environment including detected objects, or the like) should be reported to the first autonomous vehicle based in the current position of the first autonomous vehicle. As an example, the third autonomous vehicle may be traveling x feet ahead of the first autonomous vehicle in the same lane of the road and may have reported an obstruction in the road. If x feet is within a predefined radius, the processing system may determine that the first autonomous vehicle should be notified of the obstruction. Based on the data sent by the processing system, the operating systems of the first autonomous vehicle may adjust the operation of the first autonomous vehicle.

The method 200 may then return to step 204 and continue as described above. Thus, the method 200 may iterate through the steps 204-210 to continuously monitor a plurality of autonomous vehicles and facilitate sharing of information among the plurality of autonomous vehicles.

As discussed above, data may be shared among autonomous vehicles using direct, vehicle-to-vehicle communications and/or may be shared using indirect communications through an intermediary (e.g., a server or centralized collection point in the cloud). In the case where data is shared directly via vehicle-to-vehicle communications, the spectral frequency of the signals carrying the data between vehicles may be dynamically adjusted in response to outside conditions (e.g., conditions external to the vehicles). For instance, when the vehicles sharing data are traveling in areas with relatively light traffic density (e.g., traffic density below a threshold traffic density), where less atmospheric attenuation of signals is likely, lower frequency signals may be used to obtain data from and share data with vehicles over greater distances (e.g., to cast a wider net for data). Fewer vehicles and objects means there are fewer objects to potentially interfere with the signals. However, when the vehicles are traveling in areas with relatively heavy traffic density (e.g., traffic density above a threshold traffic density), wherein greater atmospheric attenuation of signals is likely, higher frequency signals may be used to obtain data from and share data with vehicles over shorter distances. A larger number of vehicles and objects means there are more objects to potentially interfere with the signals Similarly, the spatial footprint of the signals carrying the data between vehicles may also be dynamically adjusted in response to outside conditions (e.g., conditions external to the vehicles). For instance, when the vehicles sharing data are traveling in areas with relatively light traffic density (e.g., traffic density below a threshold traffic density), where speed of travel may be relatively fast, the geographic radius within which data is shared may be increased to obtain data from and share data with vehicles over greater distances (e.g., to cast a wider net for data). For example, if traffic is moving very quickly, then an object that is currently in the middle of the road fifty feet ahead of a vehicle may be likely to still be in the middle of the road when the vehicle travels fifty feet. However, when the vehicles are traveling in areas with relatively heavy traffic density (e.g., traffic density above a threshold traffic density), where speed of travel may be relatively slow, the geographic radius within which data is shared may be decreased to obtain data from and share data with vehicles over shorter distances. For instance, if traffic is moving very slowly, then an object that is currently in the middle of the road twenty feet ahead of a vehicle may no longer be in the middle of the road by the time the vehicle travels twenty feet.

It should be noted that any references to a "first vehicle," "second vehicle," "third vehicle," and the like in the above discussion are not intended to imply that a certain number of vehicles are required by the present disclosure. For instance, a reference to a "third vehicle," does not necessarily require that a "first vehicle" and "second vehicle" be present. Nor does the absence of a reference to a "fourth vehicle," "fifth vehicle," or the like necessarily imply that more than two or three vehicles cannot be present or involved in the exchange of data in accordance with the method 200. Identifiers such as "first," "second," "third," and the like are merely used for the purposes of clarity, to distinguish between separate vehicles.

In addition, although not specifically specified, one or more steps, functions or operations of the method 200 or 300 may include a storing, displaying and/or outputting step as required for a particular application. In other words, any data, records, fields, and/or intermediate results discussed in the method 200 or 300 can be stored, displayed and/or outputted either on the device executing the method 200 or 300, or to another device, as required for a particular application. Furthermore, steps, blocks, functions, or operations in FIG. 2 or FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or 300 may comprise optional steps, or can be combined, separated, and/or performed in a different order from that described.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for controlling an autonomous vehicle, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300, or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 300. In one example, instructions and data for the present module or process 405 for controlling an autonomous vehicle (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for controlling an autonomous vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method, comprising:
reporting, by a processing system of a first autonomous vehicle to a first remote device, at least one of: a position of the first autonomous vehicle or an object detected in an environment surrounding the first autonomous vehicle;
receiving, by the processing system from at least one of: the first remote device or a second remote device, data, wherein the data comprises at least one of: a current position of a second autonomous vehicle or an object detected in an environment surrounding the second autonomous vehicle; and
adjusting, by the processing system, an operation of the first autonomous vehicle in response to the data, wherein the adjusting comprises adjusting a spectral frequency of a signal used to perform the reporting.

2. The method of claim 1, wherein the environment surrounding the first autonomous vehicle comprises a predefined radius surrounding the first autonomous vehicle.

3. The method of claim 1, wherein the first remote device is a server, and the second remote device is the second autonomous vehicle.

4. The method of claim 1, wherein the first remote device is the second autonomous vehicle, and the second remote device is a server.

5. The method of claim 4, wherein the second autonomous vehicle is within a predefined radius of proximity to the first autonomous vehicle.

6. The method of claim 5, wherein the predefined radius of proximity is defined in terms of geographic distance.

7. The method of claim 5, wherein the predefined radius of proximity is defined in terms of signal strength.

8. The method of claim 1, wherein the adjusting further comprises:
adjusting, by the processing system, a speed of travel of the first autonomous vehicle.

9. The method of claim 1, wherein the adjusting further comprises:
adjusting, by the processing system, a direction of travel of the first autonomous vehicle.

10. The method of claim 1, wherein the adjusting further comprises:
adjusting, by the processing system, a sampling rate at which a sensor system of the first autonomous vehicle collects data from the environment surrounding the first autonomous vehicle.

11. The method of claim 1, wherein additional data is received from a plurality of additional remote devices, the additional data comprising current positions of a plurality of autonomous vehicles in addition to the first autonomous vehicle and the second autonomous vehicle, and the adjusting the spectral frequency comprises:
decreasing, by the processing system, the spectral frequency when the data and the additional data indicate a traffic density below a threshold traffic density in the environment surrounding the first autonomous vehicle.

12. The method of claim 1, wherein additional data is received from a plurality of additional remote devices, the additional data comprising current positions of a plurality of autonomous vehicles in addition to the first autonomous vehicle and the second autonomous vehicle, and the adjusting the spectral frequency comprises:
increasing, by the processing system, the spectral frequency when the data and the additional data indicate a traffic density above a threshold traffic density in the environment surrounding the first autonomous vehicle.

13. The method of claim 1, wherein the adjusting further comprises:
adjusting, by the processing system, a spatial footprint of a signal used to perform the reporting.

14. The method of claim 13, wherein additional data is received from a plurality of additional remote devices, the additional data comprising current positions of a plurality of autonomous vehicles in addition to the first autonomous vehicle and the second autonomous vehicle, and the adjusting the spatial footprint comprises:

increasing, by the processing system, the spatial footprint when the data and the additional data indicate a traffic density below a threshold traffic density in the environment surrounding the first autonomous vehicle.

15. The method of claim 13, wherein additional data is received from a plurality of additional remote devices, the additional data comprising current positions of a plurality of autonomous vehicles in addition to the first autonomous vehicle and the second autonomous vehicle, and the adjusting the spatial footprint comprises:

decreasing, by the processing system, the spatial footprint when the data and the additional data indicate a traffic density above a threshold traffic density in the environment surrounding the first autonomous vehicle.

16. The method of claim 1, wherein at least one of: the first autonomous vehicle or the second autonomous vehicle is an automobile.

17. The method of claim 1, wherein at least one of: the first autonomous vehicle or the second autonomous vehicle is a drone.

18. The method of claim 1, wherein additional data is received from a plurality of additional remote devices, the additional data comprising current positions of a plurality of autonomous vehicles in addition to the first autonomous vehicle and the second autonomous vehicle, and the spectral frequency is adjusted in response to an atmospheric attenuation of the signal caused by a traffic density indicated in the data and the additional data.

19. A non-transitory computer-readable medium storing instructions which, when executed by a processing system of a first autonomous vehicle, cause the processing system to perform operations, the operations comprising:

reporting to a first remote device at least one of: a position of the first autonomous vehicle or an object detected in an environment surrounding the first autonomous vehicle;

receiving, from at least one of: the first remote device or a second remote device, data, wherein the data comprises at least one of: a current position of a second autonomous vehicle or an object detected in an environment surrounding the second autonomous vehicle; and adjusting an operation of the first autonomous vehicle in response to the data, wherein the adjusting comprises adjusting a spectral frequency of a signal used to perform the reporting.

20. A device, comprising:

a processing system of a first autonomous vehicle; and a non-transitory computer-readable medium storing instructions which, when executed by the processing system, cause the processing system to perform operations, the operations comprising:

reporting, to a first remote device, at least one of: a position of the first autonomous vehicle or an object detected in an environment surrounding the first autonomous vehicle;

receiving, from at least one of: the first remote device or a second remote device, data, wherein the data comprises at least one of: a current position of a second autonomous vehicle or an object detected in an environment surrounding the second autonomous vehicle; and adjusting an operation of the first autonomous vehicle in response to the data, wherein the adjusting comprises adjusting a spectral frequency of a signal used to perform the reporting.

* * * * *